United States Patent
Liu et al.

(10) Patent No.: US 12,107,500 B2
(45) Date of Patent: Oct. 1, 2024

(54) CONVERTER DEVICE WITH A PLURALITY OF RAMP SIGNALS AND POWER CONVERSION METHOD THEREOF

(71) Applicant: REALTEK SEMICONDUCTOR CORPORATION, Hsinchu (TW)

(72) Inventors: Yen-Wei Liu, Hsinchu (TW); Tsung-Yen Tsai, Hsinchu (TW); Wen-Hau Yang, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 220 days.

(21) Appl. No.: 17/750,432

(22) Filed: May 23, 2022

(65) Prior Publication Data

US 2022/0385185 A1  Dec. 1, 2022

(30) Foreign Application Priority Data

May 25, 2021 (TW) .................................. 110118929

(51) Int. Cl.
*H02M 3/158* (2006.01)

(52) U.S. Cl.
CPC .................................. *H02M 3/158* (2013.01)

(58) Field of Classification Search
CPC ............................. H02M 1/009; H02M 3/158
See application file for complete search history.

(56) References Cited

U.S. PATENT DOCUMENTS

2010/0026267 A1* 2/2010 Easwaran ............. H02M 3/158
                                                    323/288

FOREIGN PATENT DOCUMENTS

| CN | 109687705 A | * | 4/2019 | |
| CN | 110492738 A | * | 11/2019 | ............ H02M 1/009 |

OTHER PUBLICATIONS

OA letter of a counterpart TW application (appl. No. 110118929) mailed on Feb. 10, 2022. Summary of the TW OA letter: 1. Claims 1-3, 5-7, and 9-10 are rejected as allegedly being anticipated by cited reference 1 (CN 110492738 A). 2. Claim 4 is rejected as allegedly being unpatentable over the cited reference 1. 3. Claim 8 is allowable. Correspondence between claims of TW counterpart application and claims of US application: 1. Claims 1-10 in TW counterpart application correspond to claims 1-9 and 11 in US application, respectively.

(Continued)

*Primary Examiner* — Harry R Behm
(74) *Attorney, Agent, or Firm* — WPAT, P.C

(57) ABSTRACT

A power converter device includes a converter circuit, a detector circuitry, an energy distribution logic circuit, and a ramp generator circuit. The converter circuit is configured to switch charging paths and discharging paths of an inductor according to switching signals, in order to generate output voltages. The detector circuitry is configured to generate error signals according to the output voltages and reference voltages, and respectively compare the error signals with ramp signals, in order to generate decision signals. The energy distribution logic circuit is configured to generate the switching signals and control signals according to the plurality of decision signals. The ramp generator circuit is configured to generate the ramp signals according to the control signals, in which a starting time of each of the ramp signals is different from each other.

16 Claims, 5 Drawing Sheets

(56) References Cited

OTHER PUBLICATIONS

Y. Lee et al., "Interleaving Energy-Conservation Mode (IECM) Control in Single-Inductor Dual-Output (SIDO) Step-Down Converters With 91% Peak Efficiency," in IEEE Journal of Solid-State Circuits, vol. 46, No. 4, pp. 904-915, Apr. 2011, doi: 10.1109/JSSC.2011.2108850.

Y.-H. Lee et al., "Minimized Transient and Steady-State Cross Regulation in 55-nm CMOS Single-Inductor Dual-Output (SIDO) Step-Down DC-DC Converter," in IEEE Journal of Solid-State Circuits, vol. 46, No. 11, pp. 2488-2499, Nov. 2011, doi: 10.1109/JSSC.2011.2164019.

* cited by examiner

CONVERTER DEVICE WITH A PLURALITY OF RAMP SIGNALS AND POWER CONVERSION METHOD THEREOF

BACKGROUND OF THE INVENTION

1. Field of the Invention

The present disclosure relates to a power converter device, especially to a single-inductor dual-output power converter device and a power conversion method thereof.

2. Description of Related Art

In approaches that employ an interleaving energy-conservation mode, a converter circuit generates a sensing voltage by summing up error signals generated from different output voltages, in order to regulate those output voltages. In these approaches, as the sensing voltage is generated by summing up the error signals, the level of the sensing voltage may be too high and is thus not suitable to low-voltage applications. Moreover, as the sensing voltage includes information of the error signals from different output voltages, the cross-regulation of the converter circuit may be affected accordingly.

SUMMARY OF THE INVENTION

In some aspects of the present disclosure, a power converter device includes a converter circuit, a detector circuitry, an energy distribution logic circuit, and a ramp generator circuit. The converter circuit is configured to switch a plurality of charging paths and a plurality of discharging paths of an inductor according to a plurality of switching signals, in order to generate a plurality of output voltages. The detector circuitry is configured to generate a plurality of error signals according to the plurality of output voltages and a plurality of reference voltages, and respectively compare the plurality of error signals with a plurality of ramp signals, in order to generate a plurality of decision signals. The energy distribution logic circuit is configured to generate the plurality of switching signals and a plurality of control signals according to the plurality of decision signals. The ramp generator circuit is configured to generate the plurality of ramp signals according to the plurality of control signals, in which a starting time of each of the plurality of ramp signals is different from each other.

In some aspects of the present disclosure, a power conversion method includes the following operations: switching a plurality of charging paths and a plurality of discharging paths of an inductor according to a plurality of switching signals, in order to generate a plurality of output voltages; generating a plurality of error signals according to the plurality of output voltages and a plurality of reference voltages, and respectively comparing the plurality of error signals with a plurality of ramp signals, in order to generate a plurality of decision signals; generating the plurality of switching signals and a plurality of control signals according to the plurality of decision signals; and generating the plurality of ramp signals according to the plurality of control signals, in which a starting time of each of the plurality of ramp signals is different from each other.

These and other objectives of the present disclosure will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

In this document, the term "coupled" may also be termed as "electrically coupled," and the term "connected" may be termed as "electrically connected." "Coupled" and "connected" may mean "directly coupled" and "directly connected" respectively, or "indirectly coupled" and "indirectly connected" respectively. "Coupled" and "connected" may also be used to indicate that two or more elements cooperate or interact with each other. In this document, the term "circuitry" may indicate a system formed with one or more circuits. The term "circuit" may indicate an object, which is formed with one or more transistors and/or one or more active/passive elements based on a specific arrangement, for processing signals.

As used herein, the term "and/or" includes any and all combinations of one or more of the associated listed items. Although the terms "first," "second," etc., may be used herein to describe various elements, these elements should not be limited by these terms. These terms are used to distinguish one element from another. For example, a first element could be termed a second element, and, similarly, a second element could be termed a first element, without departing from the scope of the embodiments. For ease of understanding, like elements in various figures are designated with the same reference number.

Figure 1:
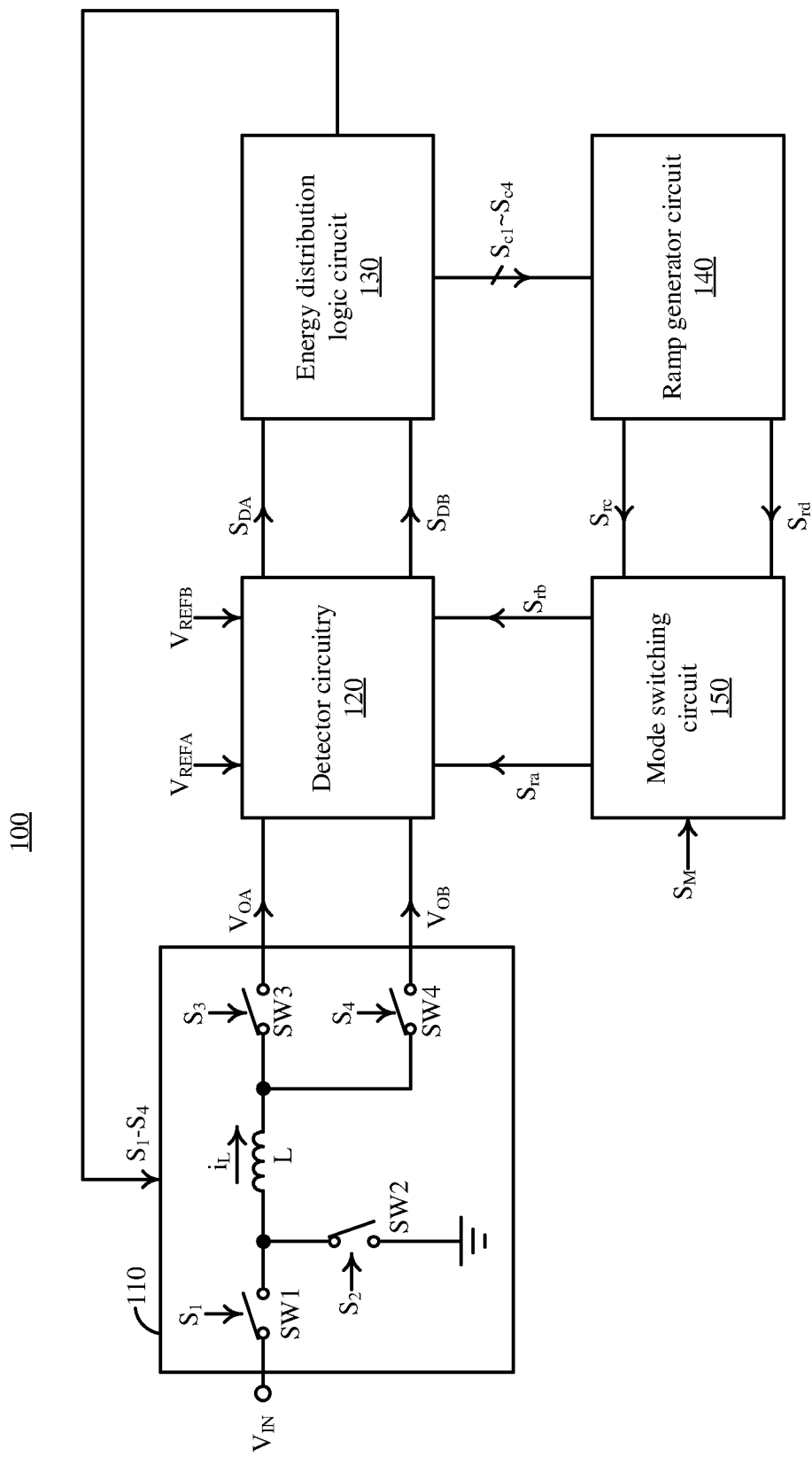
FIG. 1 is a schematic diagram of a power converter device according to some embodiments of the present disclosure.

FIG. 1 is a schematic diagram of a power converter device 100 according to some embodiments of the present disclosure. The power converter device 100 includes a converter circuit 110, a detector circuitry 120, an energy distribution logic circuit 130, a ramp generator circuit 140, and a mode switching circuit 150.

The converter circuit 110 may be a single-inductor multi-output DC to DC converter circuit. In this example, the converter circuit 110 is a single-inductor dual-output DC to DC converter circuit, which may generate an output voltage $V_{OA}$ and an output voltage $V_{OB}$ according to an input signal $V_{IN}$, but the present disclosure is not limited thereto. In other embodiments, the converter circuit 110 is able to generate two or more output voltages.

In some embodiments, the converter circuit 110 may selectively switch charging path(s) and discharging path(s) of an inductor L according to the switching signals $S_1$-$S_4$, in order to generate the output voltage $V_{OA}$ and the output voltage $V_{OB}$. In greater detail, the converter circuit 110 includes switches SW1-SW4 and the inductor L. The switches SW1-SW4 may be, but not limited to, implemented with power transistors. A first terminal of the switch SW1 is configured to receive the input signal $V_{IN}$, a second terminal of the switch SW1 is coupled to a first terminal of the switch SW2 and a first terminal of the inductor L, and a control terminal of the switch SW1 is configured to receive the switching signal $S_1$. A second terminal of the switch SW2 is coupled to ground, and a control terminal of the switch SW2 is configured to receive the switching signal $S_2$. A first terminal of the switch SW3 is coupled to a second terminal of the inductor L, a second terminal of the switch SW3 is configured to generate the output voltage $V_{OA}$, and a control terminal of the switch SW3 is configured to receive the switching signal $S_3$. A first terminal of the switch SW4 is coupled to the second terminal of the inductor L, a second terminal of the switch SW4 is configured to generate the output voltage $V_{OB}$, and a control terminal of the switch SW4 is configured to receive the switching signal $S_4$.

When the switch SW1 and the switch SW3 are turned on (i.e., closed or short-circuit) and the switch SW2 and the switch SW4 are not turned on (i.e., opened or open-circuit), the turn-on switches SW1 and SW3 are able to form a first charging path of the inductor L. Under this condition, the inductor L can be charged by the input signal $V_{IN}$. During an interval of the inductor L storing energy, the inductor L also transfers energy to a node that generates the output voltage $V_{OA}$, and thus the current $i_L$ of the inductor L has a positive slope. When the switch SW2 and the switch SW3 are turned on and the switch SW1 and the switch SW4 are not turned on, the turn-on switches SW2 and SW3 are able to form a first discharging path of the inductor L. Under this condition, the inductor L cannot store energy based on the input signal $V_{IN}$, and will discharge the stored energy to the node that generates the output voltage $V_{OA}$, and thus the current $i_L$ of the inductor L has a negative slope.

When the switch SW1 and the switch SW4 are turned on and the switch SW2 and the switch SW3 are not turned on, the turn-on switches SW1 and SW4 are able to form a second charging path of the inductor L. Under this condition, the inductor L can be charged by the input signal $V_{IN}$. During an interval of the inductor L storing energy, the inductor L also transfers energy to a node that generates the output voltage $V_{OB}$, and thus the current $i_L$ of the inductor L has a positive slope. When the switch SW2 and the switch SW4 are turned on and the switch SW1 and the switch SW3 are not turned on, the turn-on switches SW2 and SW4 are able to form a second discharging path of the inductor L. Under this condition, the inductor L cannot store energy based on the input signal $V_{IN}$, and will discharge the stored energy to the node that generates the output voltage $V_{OB}$, and thus the current $i_L$ of the inductor L has a negative slope.

The detector circuitry 120 is configured to generate error signals according to the output voltages and reference voltages, and respectively compare the error signals with ramp signals, in order to generate decision signals. For example, the detector circuitry 120 may generate error signals (e.g., error signals $S_{EA}$ and $S_{EB}$ in FIG. 2A) according to the output voltages $V_{OA}$ and $V_{OB}$ and reference voltages $V_{REFA}$ and $V_{REFB}$. The detector circuitry 120 may compare a first error signal in the error signals (e.g., the error signal $S_{EA}$ in FIG. 2A) with a ramp signal $S_{ra}$ to generate a decision signal $S_{DA}$, and compare a second error signal in the error signals (e.g., the error signal $S_{EB}$ in FIG. 2A) with the ramp signal $S_{rb}$ to generate a decision signal $S_{DB}$.

In some embodiments, the detector circuitry 120 directly detects the output voltages $V_{OA}$ and $V_{OB}$. Alternatively, according to practical applications, in some other embodiments, the power converter device 100 may further include a voltage divider circuit (not shown), which may divide the output voltage $V_{OA}$ and the output voltage $V_{OB}$ to generate a first feedback signal (not shown) and a second feedback signal (not shown). As a result, the detector circuitry 120 may generate the error signals according to the first feedback signal, the second feedback signal, and the reference voltages $V_{REFA}$ and $V_{REFB}$.

The energy distribution logic circuit 130 may generate control signals $S_{c1}$-$S_{c4}$ and the switching signals $S_1$-$S_4$ according to the decision signal $S_{DA}$ and the decision signal $S_{DB}$, in order to switch the charging paths and the discharging paths of the inductor L according to current load requirements. In some embodiments, the energy distribution logic circuit 130 may be a digital logic circuit, which is able to perform operations in FIG. 3A or FIG. 3B to generate the control signals $S_{c1}$-$S_{c4}$ and the switching signals $S_1$-$S_4$.

The ramp generator circuit 140 generates the ramp signals according to the control signals. For example, the ramp generator circuit 140 generates the ramp signal $S_{rc}$ and the ramp signal $S_{rd}$ according to the control signals $S_{c1}$-$S_{c4}$. According to the mode signal $S_M$, the mode switching circuit 150 selectively outputs the ramp signal $S_r$ to be one of the ramp signal $S_{ra}$ and the ramp signal $S_{rb}$ and outputs the ramp signal $S_{rd}$ to be another one of the ramp signal $S_{ra}$ and the ramp signal $S_{rb}$. In some embodiments, the mode switching circuit 150 may be a switching circuit formed with switches, which may selectively output the ramp signal $S_{rc}$ and the ramp signal $S_{rd}$ to be the ramp signal $S_{ra}$ and the ramp signal $S_{rb}$ according to the mode signal $S_M$.

For example, when the mode signal $S_M$ has a first logic value (e.g., a logic value of 0), the mode switching circuit 150 may output the ramp signal $S_{rc}$ to be the ramp signal $S_{ra}$ and output the ramp signal $S_{rd}$ to be the ramp signal $S_{rb}$. Under this condition, a corresponding one signal in the error signals (e.g., the error signal $S_{EA}$) is utilized to determine a transition point (e.g., a transition point N1 in FIG. 3A) that indicates a switching from the first charging path to the second charging path and a transition point (e.g., a transition point N2 in FIG. 3A) that indicates a switching from the second discharging path to the first discharging path. Alternatively, when the mode signal $S_M$ has a second logic value (e.g., a logic value of 1), the mode switching circuit 150 may output the ramp signal $S_{rd}$ to be the ramp signal $S_{ra}$ and output the ramp signal $S_{rc}$ to be the ramp signal $S_{rb}$. Under this condition, another one signal in the error signals (e.g., the error signal $S_{EB}$ in FIG. 2A) is utilized to determine a transition point (e.g., a transition point N3 in FIG. 3B) that indicates a switching from the second charging path to the first charging path and a transition point (e.g., a transition point N4 in FIG. 3B) for determining whether to switch from the first discharging path to the second discharging path. Operations regarding herein will be described with reference to FIG. 3A and FIG. 3B.

Figure 3A:
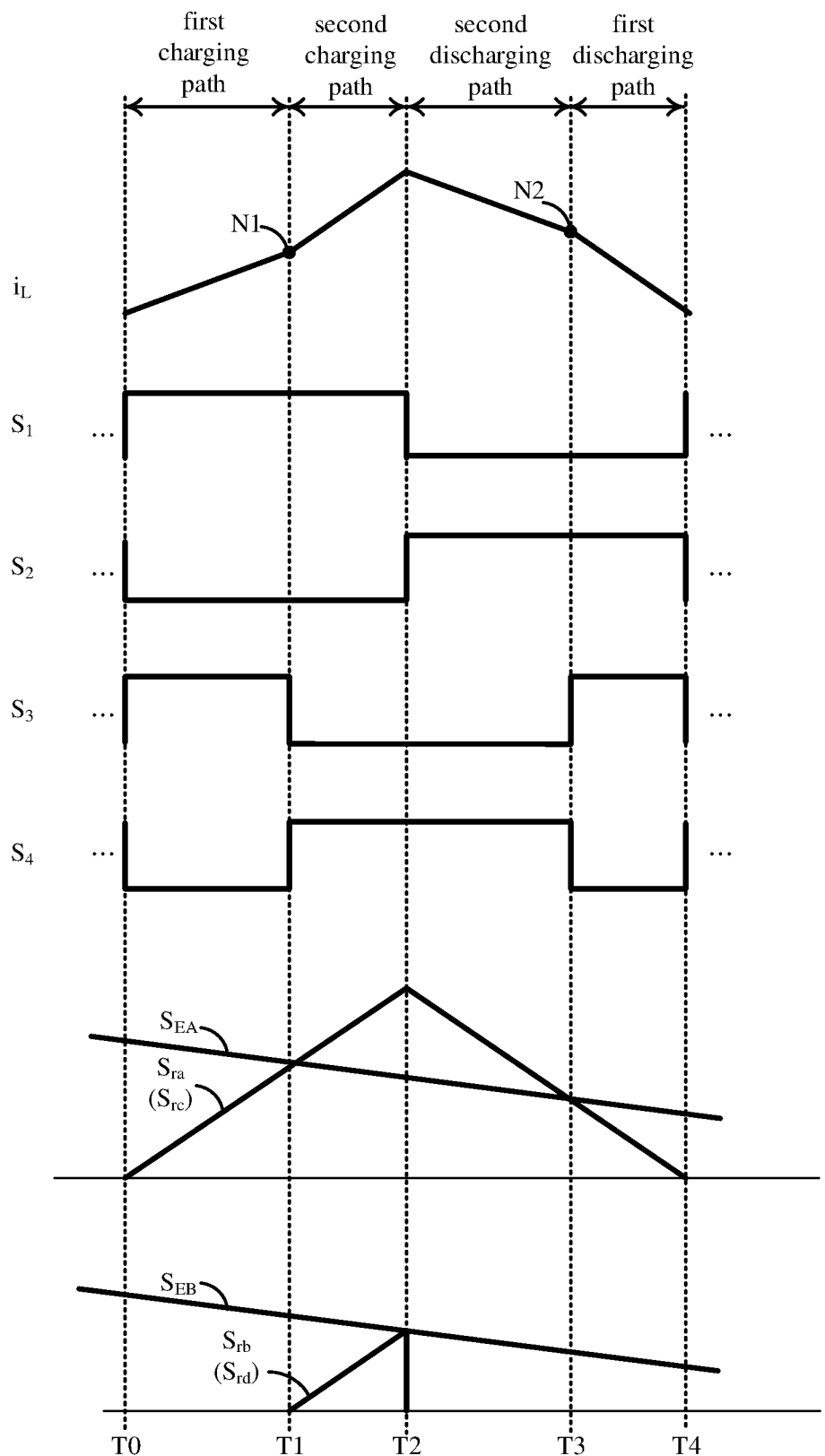
FIG. 3A is a schematic diagram of waveforms of relevant signals in FIG. 1 according to some embodiments of the present disclosure.
Figure 3B:
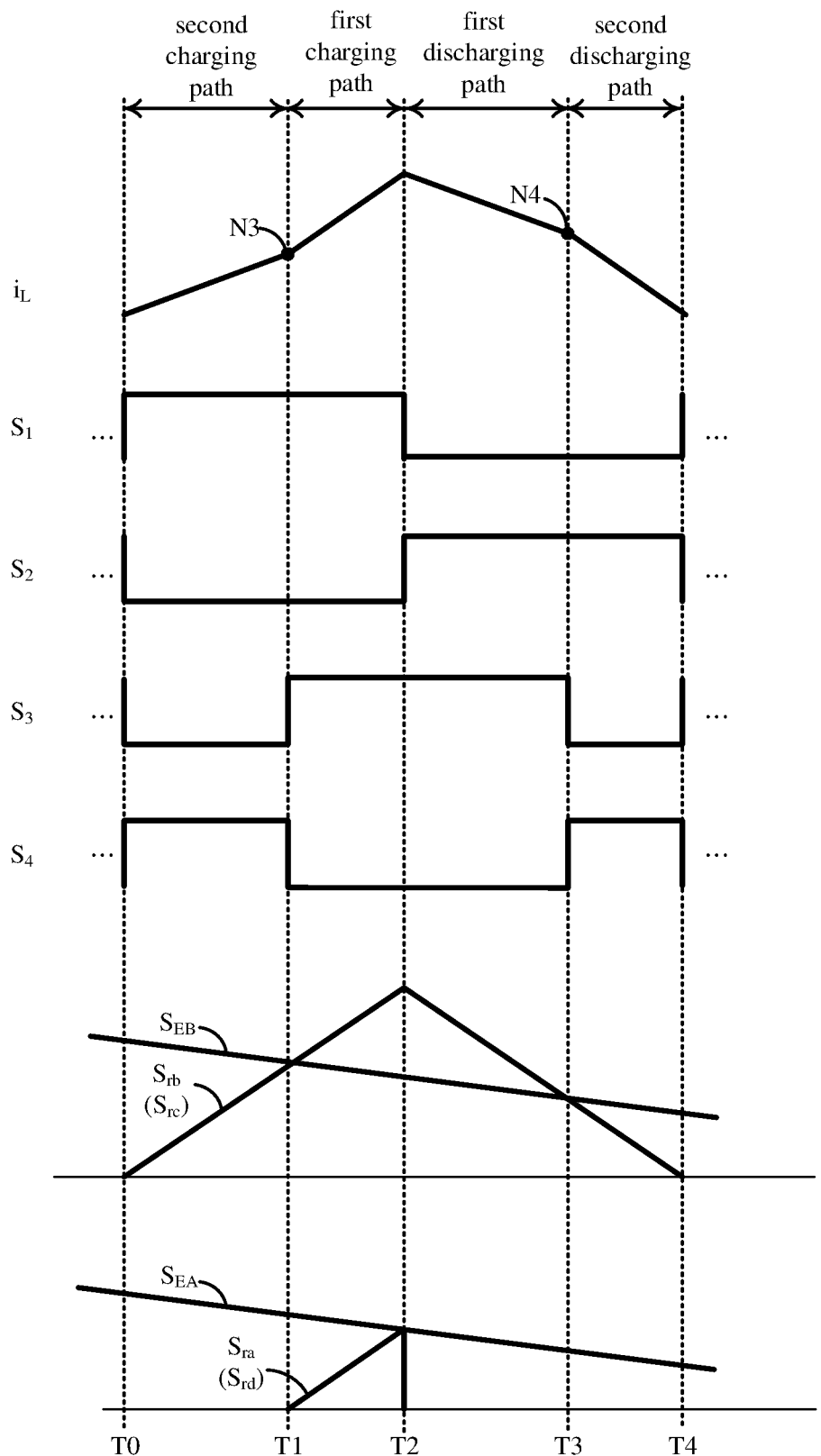
FIG. 3B is a schematic diagram of waveforms of relevant signals in FIG. 1 according to some embodiments of the present disclosure.

In some embodiments, a starting time of each ramp signal generated from the ramp generator circuit 140 is different from each other. For example, as shown in FIG. 3A or FIG. 3B, the starting time of the ramp signal $S_{ra}$ is different from that of the ramp signal $S_{rb}$. In other words, the detector circuitry 120 respectively compares the different error signals (e.g., the error signal $S_{EA}$ and the error signal $S_{EB}$) with the ramp signals (e.g., the ramp signal $S_{ra}$ and the ramp signal $S_{rb}$) at different time. In some related approaches, a single-inductor dual-output converter circuit sums up multiple error signals to generate a sensing voltage, and controls the charging/discharging paths of the inductor according to the sensing voltage. In these approaches, as the sensing voltage is generated by summing up the error signals, the level of the sensing voltage will be higher than the level of a single error signal, and thus the level of the ramp signal (which is for comparison) will be higher. As a result, the sensing voltage and/or the ramp signal(s) may be near saturation in low voltage environments, and thus not suitable for low voltage applications. Furthermore, as the sensing voltage is generated based on the error signals that are associated with the output voltages, the output voltages may interact with each other, which results in a higher cross-regulation of the converter circuit.

Compared with the above approaches, as mentioned above, the detector circuitry 120 respectively compares the error signals $S_{EA}$ and $S_{EB}$ with the ramp signals $S_{ra}$ and $S_{rb}$ at different time. In other words, the detector circuitry 120 can generate the decision signal $S_{DA}$ and the decision signal $S_{DB}$ without summing up the error signal $S_{EA}$ and the error signal $S_{EB}$. As a result, the levels of the ramp signals $S_{ra}$ and $S_{rb}$ can be lower, and thus the power converter device 100 is suitable for low voltage requirements and low power consumption requirements. Moreover, as the error signal $S_{EA}$ and the error signal $S_{EB}$ are not summed up, the output voltage $V_{OA}$ and the output voltage $V_{OB}$ can be individually controlled. As a result, the cross-regulation of the converter circuit 110 can be improved.

The above examples are illustrated with two output voltages $V_{OA}$ and $V_{OB}$, but the present disclosure is not limited thereto. In other examples, if the converter circuit 110 is configured to generate output voltages $V_{OA}$, $V_{OB}$, . . . , and $V_{ON}$ (not shown), the detector circuitry 120 may generate error signals $S_{EA}$, $S_{EB}$, . . . , and $S_{EN}$ (not shown) according to the output voltages $V_{OA}$, $V_{OB}$, . . . , and $V_{ON}$ and the reference voltages $V_{REFA}$, and $V_{REFB}$, . . . , and $V_{REFN}$ (not shown). The detector circuitry 120 may respectively compare the error signals $S_{EA}$, $S_{EB}$, . . . , and $S_{EN}$ (not shown) with ramp signals $S_{ra}$, $S_{rb}$, . . . , and $S_m$ (not shown), in order to generate decision signals $S_{DA}$, $S_{DB}$, . . . , and $S_{DN}$ (not shown). In other words, various arrangements of the converter circuit 110, the detector circuitry 120, the energy distribution logic circuit 130 and the ramp generator circuit 140 for generating two or more output voltages are within the contemplated scope of the present disclosure.

Figure 2A:
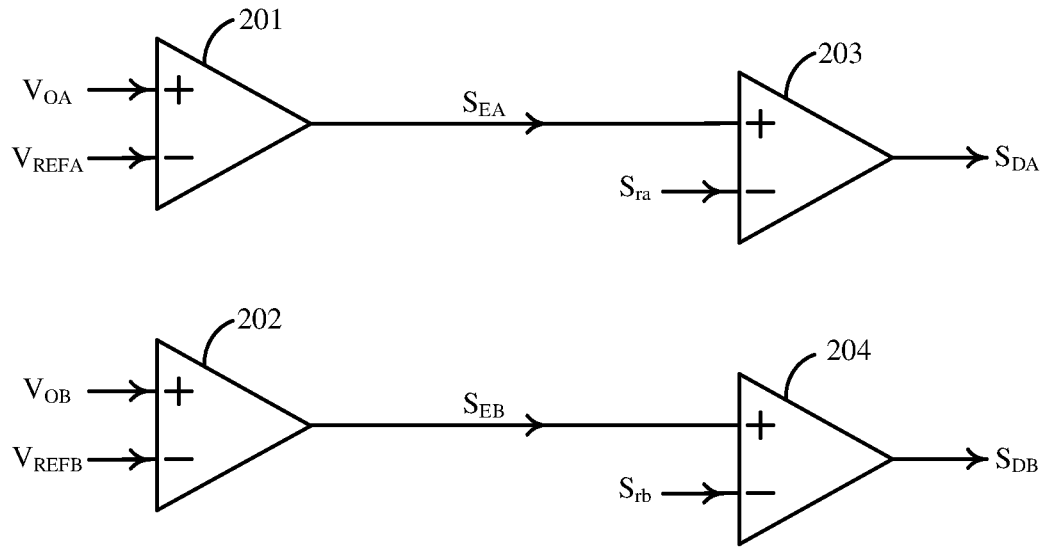
FIG. 2A is a schematic diagram of the detector circuitry in FIG. 1 according to some embodiments of the present disclosure.

FIG. 2A is a schematic diagram of the detector circuitry 120 in FIG. 1 according to some embodiments of the present disclosure. The detector circuitry 120 includes an error amplifier circuit 201, an error amplifier circuit 202, a comparator circuit 203, and a comparator circuit 204.

The error amplifier circuit 201 is configured to generate the error signal $S_{EA}$ according to the output voltage $V_{OA}$ and the reference voltage $V_{REFA}$. The error amplifier circuit 202 is configured to generate the error signal $S_{EB}$ according to the output voltage $V_{OB}$ and the reference voltage $V_{REFB}$. The comparator circuit 203 is configured to compare the error signal $S_{EA}$ with the ramp signal $S_{ra}$, in order to generate the decision signal $S_{DA}$. For example, when the error signal $S_{EA}$ is lower than or equal to the ramp signal $S_{ra}$, the comparator circuit 203 generates the decision signal $S_{DA}$ having the logic value of 0. Alternatively, when the error signal $S_{EA}$ is higher than the ramp signal $S_{ra}$, the comparator circuit 203 generates the decision signal $S_{DA}$ having the logic value of 1. Similarly, the comparator circuit 204 is configured to compare the error signal $S_{EB}$ with the ramp signal $S_{rb}$, in order to generate the decision signal $S_{DB}$. For example, when the error signal $S_{EB}$ is lower than or equal to the ramp signal $S_{rb}$, the comparator circuit 204 generates the decision signal $S_{DB}$ having the logic value of 0. When the error signal $S_{EB}$ is higher than the ramp signal $S_{rb}$, the comparator circuit 204 generates the decision signal $S_{DB}$ having the logic value of 1.

Figure 2B:
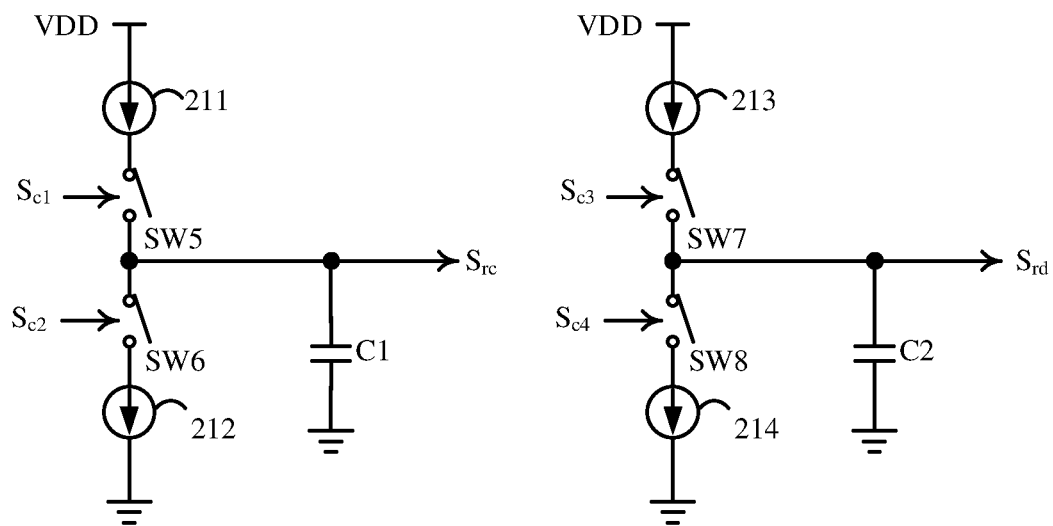
FIG. 2B is a schematic diagram of the ramp generator circuit in FIG. 1 according to some embodiments of the present disclosure.

FIG. 2B is a schematic diagram of the ramp generator circuit 140 in FIG. 1 according to some embodiments of the present disclosure. The ramp generator circuit 140 includes current source circuits 211-214, switches SW5-SW8, and capacitors C1-C2. The switch SW5 and the switch SW6 control the capacitor C1 according to the control signal $S_{c1}$ and the control signal $S_{c2}$, in order to generate the ramp signal $S_{rc}$. The switch SW7 and the switch SW8 control the capacitor C2 according to the control signal $S_{c3}$ and the control signal $S_{c4}$, in order to generate the ramp signal $S_{rd}$.

In greater detail, a first terminal of the current source circuit 211 receives a voltage VDD, and a second terminal of the current source circuit 211 is coupled to a first terminal of the switch SW5. A second terminal of the switch SW5 is coupled to a first terminal of the switch SW6, and a control terminal of the switch SW5 receives the control signal $S_{c1}$. A second terminal of the switch SW6 is coupled to a first terminal of the current source circuit 212, and a control terminal of the switch SW6 receives the control signal $S_{c2}$. A second terminal of the current source circuit 212 is coupled to ground. A first terminal of the capacitor C1 is coupled to the second terminal of the switch SW5 and the first terminal of the switch SW6 to generate the ramp signal $S_{rc}$, and a second terminal of the capacitor C1 is coupled to ground. When the switch SW5 is turned on in response to the control signal $S_{c1}$, the current source circuit 211 may charge the capacitor C1 to generate the ramp signal $S_{rd}$ having the positive slope. Alternatively, when the switch SW6 is turned on in response to the control signal $S_{c2}$, the capacitor C1 may be discharged via the current source circuit 212 to generate the ramp signal $S_{rd}$ having the negative slope.

Similarly, a first terminal of the current source circuit 213 receives the voltage VDD, and a second terminal of the current source circuit 213 is coupled to a first terminal of the switch SW7. A second terminal of the switch SW7 is coupled to a first terminal of the switch SW8, and a control terminal of the switch SW7 receives the control signal $S_{c3}$. A second terminal of the switch SW8 is coupled to the first terminal of the current source circuit 214, a control terminal of the switch SW8 receives the control signal $S_{c4}$. A second terminal of the current source circuit 214 is coupled to ground. A first terminal of the capacitor C2 is coupled to the second terminal of the switch SW7 and the first terminal of the switch SW8 to generate the ramp signal $S_{rd}$, and a second terminal of the capacitor C2 is coupled to ground. When the switch SW7 is turned on in response to the control signal $S_{c3}$, the current source circuit 213 may charge the capacitor C2 to generate the ramp signal $S_{rd}$ having the positive slope. Alternatively, when the switch SW8 is turned on in response to the control signal $S_{c4}$, the capacitor C2 may be discharged via the current source circuit 214 to generate the ramp signal $S_{rd}$ having the negative slope.

In some embodiments, the current source circuit 211 and the current source circuit 213 have substantially the same current value, the current source circuit 212 and the current source circuit 214 have substantially the same current value, and the capacitor C1 and the capacitor C2 have substantially the same capacitance value. As a result, it can assure that the ramp signal $S_{ra}$ the ramp signal $S_{rb}$ have substantially the same positive slope (as shown in FIG. 3A). The above arrangements about the current source circuit 211, the current source circuit 213, the capacitor C1, and the capacitor C2 are given for illustrative purposes, and the present disclosure is not limited thereto.

FIG. 3A is a schematic diagram of waveforms of relevant signals in FIG. 1 according to some embodiments of the present disclosure. In this example, the mode signal $S_M$ has a first logic value (e.g., the logic value of 0). As mentioned above, under this condition, the mode switching circuit 150 may output the ramp signal $S_{rc}$ to be the ramp signal $S_{ra}$, and output the ramp signal $S_{ra}$ to be the ramp signal $S_{rb}$. The error signal $S_{EA}$ is for determining the transition point N1 that indicates the switching from the first charging path to the second charging path and the transition point N2 that indicates the switching from the second discharging path to the first discharging path.

For example, during an interval between time T0 and time T1, the comparator circuit 203 determines that the error signal $S_{EA}$ is higher than the ramp signal $S_{ra}$. Under this condition, the decision signal $S_{DA}$ has the logic value of 1. In response to the decision signal $S_{DA}$, the energy distribution logic circuit 130 outputs the switching signals $S_1$ and $S_3$ having a first predetermined level (e.g., a high level) and the switching signals $S_2$ and $S_4$ having a second predetermined level (e.g., a low level). As a result, the switch SW1 and the switch SW3 are turned on to form the first charging path of the inductor L, and the switch SW2 and the switch SW4 are not turned on.

At time T1, the comparator circuit 203 determines that the error signal $S_{EA}$ is equal to the ramp signal $S_{ra}$ and outputs the decision signal $S_{DA}$ having the logic value of 0. In response to the decision signal $S_{DA}$, the energy distribution logic circuit 130 generates the switching signals $S_1$ and $S_4$ having the first predetermined level and the switching signals $S_2$ and $S_3$ having the second predetermined level. As a result, the switch SW1 and the switch SW4 are turned on to form the second charging path of the inductor L, and the switch SW2 and the switch SW3 are not turned on. On other hand, in response to the decision signal $S_{DA}$, the energy distribution logic circuit 130 further generates the corresponding control signal $S_{c3}$ and $S_{c4}$. As a result, when the error signal $S_{EA}$ is equal to the ramp signal $S_{ra}$, the ramp generator circuit 140 may generate the ramp signal $S_{rb}$. In greater detail, in response to the control signals $S_{c3}$ and $S_{c4}$, the switch SW7 is turned on and the switch SW8 is not turned on. As a result, the current source circuit 213 may start charging the capacitor C2 to generate the ramp signal $S_{rd}$. The mode switching circuit 150 may output the ramp signal $S_{rd}$ to be the ramp signal $S_{rb}$. As shown in FIG. 3A, different from the starting time of the ramp signal $S_{ra}$ (e.g., time T0), a starting time of the ramp signal $S_{rb}$ is time T1 and is determined based on a comparison result of the ramp signal $S_{ra}$ and the error signal $S_{EA}$. Furthermore, the positive slope of the ramp signal $S_{ra}$ is the same as that of the ramp signal $S_{rb}$. For example, the slope of the ramp signal $S_{ra}$ during an interval between time T0 and time T2 is m (which is a positive value), and the slope of the ramp signal $S_{rb}$ during the interval between time T1 and time T2 is m as well.

At time T2, the comparator circuit 204 determines that the error signal $S_{EB}$ is equal to the ramp signal $S_{rb}$ and outputs the decision signal $S_{DB}$ having the logic value of 0. In response to the decision signal $S_{DB}$, the energy distribution logic circuit 130 generates the switching signals $S_2$ and $S_4$ and the switching signals $S_1$ and $S_3$ having the second predetermined level. As a result, the switch SW2 and the switch SW4 are turned on to form the second discharging path of the inductor L, and the switch SW1 and the switch SW3 are not turned on.

On the other hand, in response to the decision signal $S_{DB}$, the energy distribution logic circuit 130 further generates the corresponding control signals $S_{c1}$-$S_{c4}$. As a result, when the error signal $S_{EB}$ is equal to the ramp signal $S_{rb}$, the ramp generator circuit 140 may lower the level of the ramp signal $S_{ra}$ and that of the ramp signal $S_{rb}$. In greater detail, in response to the control signals $S_{c1}$-$S_{c4}$, the switch SW6 and the switch SW8 are turned on, and the switch SW5 and the switch SW7 are not turned on. As a result, the capacitor C1 may be discharged via the current source circuit 212, in order to start lowering the level of the ramp signal $S_{rc}$ (which is outputted to be the ramp signal $S_{ra}$). Similarly, the capacitor C2 may be discharged via the current source circuit 214, in order to start lowering the level of the ramp signal $S_{rd}$ (which is outputted to be the ramp signal $S_{rb}$).

During an interval between time T3 and time T4, the comparator circuit 203 determines that the error signal $S_{EA}$ is higher than the ramp signal $S_{ra}$ and outputs the decision signal $S_{DA}$ having the logic value of 1. In response to the decision signal $S_{DA}$, the energy distribution logic circuit 130 generates the switching signals $S_2$ and $S_3$ having the first predetermined level and the switching signals $S_1$ and $S_4$ having the second predetermined level. As a result, the switch SW2 and the switch SW3 are turned on to form the first discharging path of the inductor L, and the switch SW1 and the switch SW4 are not turned on.

In some embodiments, a starting time of each of the ramp signals is different from each other. In some embodiments, an end time of each of the ramp signals is different from each other. For example, as shown in FIG. 3A, the stating time of the ramp signal $S_{ra}$ (e.g., time T0) is different from the stating time of the ramp signal $S_{rb}$ (e.g., time T1), and the end time of the ramp signal $S_{ra}$ (e.g., time T4) is different from the end time of the ramp signal $S_{rb}$ (e.g., time T2). In other words, the detector circuitry 120 generates the corresponding decision signals $S_{DA}$ and $S_{DB}$ according to the ramp signal $S_{ra}$ and the ramp signal $S_{rb}$ at different times. As a result, the power converter device 100 can stably regulate the output voltage $V_{OA}$ and the output voltage $V_{OB}$ without summing up the error signal $S_{EA}$ and the error signal $S_{EB}$.

FIG. 3B is a schematic diagram of waveforms of relevant signals in FIG. 1 according to some embodiments of the present disclosure. In this example, the mode signal $S_M$ has the second logic value (e.g., the logic value of 1). As mentioned above, under this condition, the mode switching circuit 150 may output the ramp signal $S_{rd}$ to be the ramp signal $S_{ra}$, and output the ramp signal $S_{rc}$ to be the ramp signal $S_{rb}$, and the error signal $S_{EB}$ is for determining a transition point N3 that indicates a switching from the second charging path to the first charging path and a transition point N4 that indicates a switching from the first discharging path to the second discharging path.

For example, during the interval between time T0 and time T1, the comparator circuit 204 determines that the error signal $S_{EB}$ is higher than the ramp signal $S_{rb}$. Under this condition, the decision signal $S_{DB}$ has the logic value of 1. In response to the decision signal $S_{DB}$, the energy distribution logic circuit 130 outputs the switching signals $S_1$ and $S_4$ having the first predetermined level and the switching signals $S_2$ and $S_3$ having the second predetermined level. As a result, the switch SW1 and the switch SW4 are turned on to form the second charging path of the inductor L, and the switch SW2 and the switch SW3 are not turned on.

At time T1, the comparator circuit 204 determines that the error signal $S_{EB}$ is equal to the ramp signal $S_{rb}$ and outputs the decision signal $S_{DB}$ having the logic value of 0. In response to the decision signal $S_{DB}$, the energy distribution logic circuit 130 generates the switching signals $S_1$ and $S_3$ having the first predetermined level and the switching signals $S_2$ and $S_4$ having the second predetermined level. As a result, the switch SW1 and the switch SW3 are turned on to form the first charging path of the inductor L, and the switch SW2 and the switch SW4 are not turned on. On the other hand, in response to the decision signal $S_{DB}$, the energy distribution logic circuit 130 further generates the corresponding control signals $S_{c3}$ and $S_{c4}$. As a result, when the error signal $S_{EB}$ is equal to the ramp signal $S_{rb}$, the ramp generator circuit 140 may generate the ramp signal $S_{ra}$. In greater detail, in response to the control signals $S_{c3}$ and $S_{c4}$, the switch SW7 is turned on and the switch SW8 is not turned on. As a result, the current source circuit 213 may start charging the capacitor C2 to generate the ramp signal $S_{rd}$. The mode switching circuit 150 may output the ramp signal $S_{rd}$ to be the ramp signal $S_{ra}$. As shown in FIG. 3B, different from the starting time of the ramp signal $S_{rb}$ (e.g., time T0), the starting time of the ramp signal $S_{ra}$ is time T1 and is determined based on the comparison result of the ramp signal $S_{rb}$ and the error signal $S_{EB}$. Similarly, the slope of the ramp signal $S_{rb}$ during an interval between time T0 and time T2 is m (which is a positive value), and the slope of the ramp signal $S_{ra}$ during the interval between time T1 and time T2 is m as well.

At time T2, the comparator circuit 203 determines that the error signal $S_{EA}$ is equal to the ramp signal $S_{ra}$ and outputs the decision signal $S_{DA}$ having the logic value of 0. In response to the decision signal $S_{DA}$, the energy distribution logic circuit 130 generates the switching signals $S_2$ and $S_3$ having the first predetermined level and the switching signals $S_1$ and $S_4$ having the second predetermined level. As a result, the switch SW2 and the switch SW3 are turned on to form the first discharging path of the inductor L, and the switch SW1 and the switch SW4 are not turned on.

On the other hand, in response to the decision signal $S_{DA}$, the energy distribution logic circuit 130 further generates the corresponding control signals $S_{c1}$-$S_{c4}$. As a result, when the error signal $S_{EA}$ is equal to the ramp signal $S_{ra}$, the ramp generator circuit 140 may lower the level of the ramp signal $S_{ra}$ and that of the ramp signal $S_{rb}$. In greater detail, in response to the control signals $S_{c1}$-$S_{c4}$, the switch SW6 and the switch SW8 are turned on, and the switch SW5 and the switch SW7 are not turned on. As a result, the capacitor C1 may be discharged via the current source circuit 212, in order to start lowering the level of the ramp signal $S_{rc}$ (which is outputted to be the ramp signal $S_{rb}$). Similarly, the capacitor C2 may be discharged via the current source circuit 214, in order to start lowering the level of the ramp signal $S_{rd}$ (which is outputted to be the ramp signal $S_{ra}$).

During the interval between time T3 and time T4, the comparator circuit 204 determines that the error signal $S_{EB}$ is higher than the ramp signal $S_{rb}$ and outputs the decision signal $S_{DB}$ having the logic value of 1. In response to the decision signal $S_{DB}$, the energy distribution logic circuit 130 generates the switching signals $S_2$ and $S_4$ having the first predetermined level and the switching signals $S_1$ and $S_3$ having the second predetermined level. As a result, the switch SW2 and the switch SW4 are turned on to form the second discharging path of the inductor L, and the switch SW1 and the switch SW3 are not turned on.

In this example, the starting time of the ramp signal $S_{rb}$ (e.g., time T0) is different from the starting time of the ramp signal $S_{ra}$ (e.g., time T1), and the end time of the ramp signal $S_{rb}$ (e.g., time T4) is different from the end time of the ramp signal $S_{ra}$ (e.g., time T2). Similar to FIG. 3A, the detector circuitry 120 generates the corresponding decision signals $S_{DA}$ and $S_{DB}$ according to the ramp signal $S_{ra}$ and the ramp signal $S_{rb}$ at different time.

Figure 4:
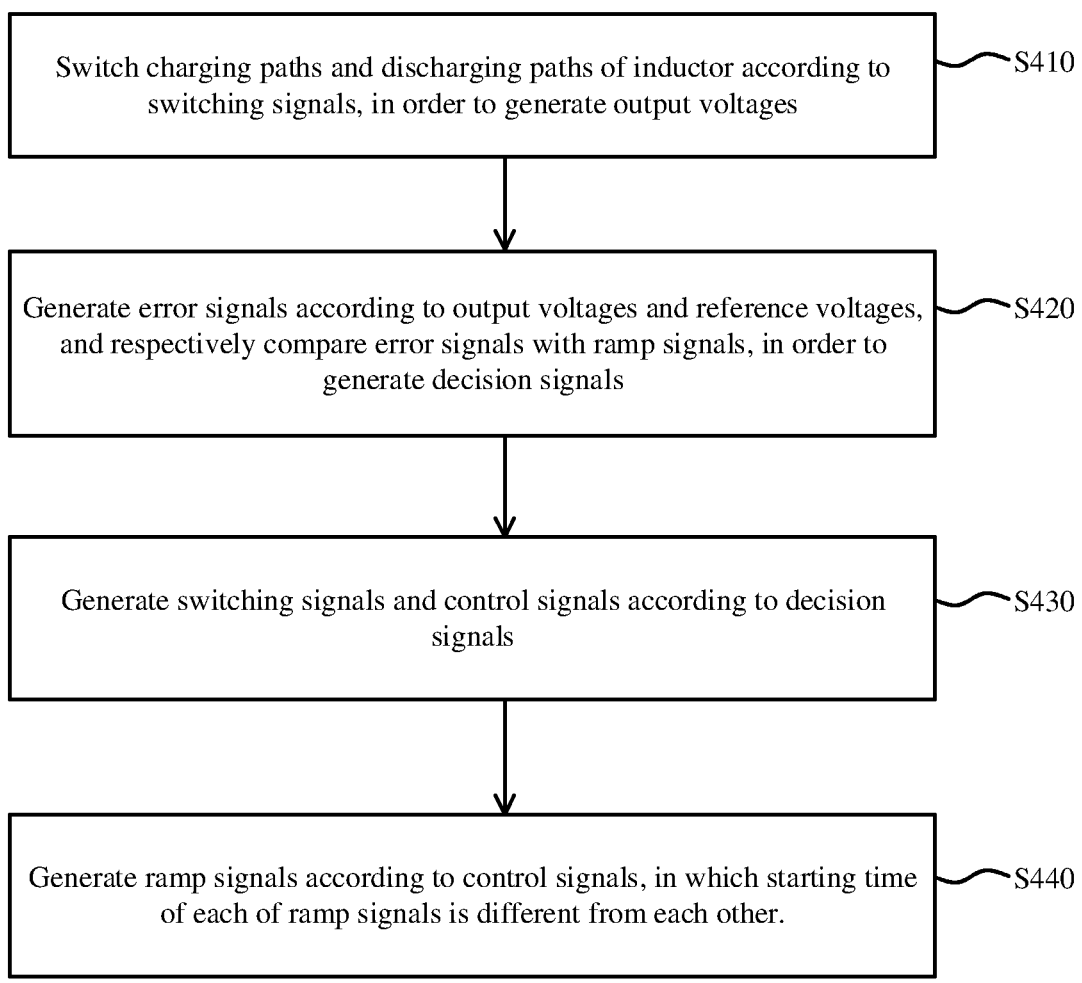
FIG. 4 is a flow chart of a power conversion method according to some embodiments of the present disclosure.

FIG. 4 is a flow chart of a power conversion method 400 according to some embodiments of the present disclosure. In some embodiments, the power conversion method 400 may be, but not limited to, performed by the power converter device 100 in FIG. 1.

In operation S410, charging paths and discharging paths of an inductor are switched according to switching signals, in order to generate output voltages. In operation S420, error signals are generated according to the output voltages and reference voltages, and the error signals are respectively compared with ramp signals, in order to generate decision signals. In operation S430, the switching signals and control signals are generated according to the decision signals. In operation S440, the ramp signals are generated according to the control signals, in which starting time of each of the ramp signals is different from each other.

The above operations of the power conversion method 400 can be understood with reference to various embodiments discussed above, and thus the repetitious descriptions are not given. The above description of the power conversion method 400 includes exemplary operations, but the operations are not necessarily performed in the order described above. Operations of the power conversion method 400 may be added, replaced, changed order, and/or eliminated as appropriate, or the operations are able to be executed simultaneously or partially simultaneously as appropriate, in accordance with the spirit and scope of various embodiments of the present disclosure.

As described above, the power converter device and the power conversion method in some embodiments of the present disclosure are able to detect different output voltage at different time. As a result, the output voltages can be regulated without summing up the error signals, in order to be suitable for low-voltage environments and improve the cross-regulation of the converter circuit.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry. Indeed, RTL is well known for its role and use in the facilitation of the design process of electronic and digital systems.

The aforementioned descriptions represent merely the preferred embodiments of the present disclosure, without any intention to limit the scope of the present disclosure thereto. Various equivalent changes, alterations, or modifications based on the claims of the present disclosure are all consequently viewed as being embraced by the scope of the present disclosure.

What is claimed is:

1. A power converter device, comprising:
   a converter circuit configured to switch a plurality of charging paths and a plurality of discharging paths of an inductor according to a plurality of switching signals, in order to generate a plurality of output voltages;
   a detector circuitry configured to generate a plurality of error signals according to the plurality of output voltages and a plurality of reference voltages, and respectively compare the plurality of error signals with a plurality of ramp signals, in order to generate a plurality of decision signals;
   an energy distribution logic circuit configured to generate the plurality of switching signals and a plurality of control signals according to the plurality of decision signals; and
   a ramp generator circuit configured to generate the plurality of ramp signals according to the plurality of control signals, wherein a starting time of each of the plurality of ramp signals is different from each other,
   wherein when a corresponding ramp signal in the plurality of ramp signals is equal to a corresponding error signal in the plurality of error signals, the ramp generator circuit is configured to lower levels of the plurality of ramp signals.

2. The power converter device of claim 1, wherein the detector circuitry generates the plurality of decision signals without summing up the plurality of error signals.

3. The power converter device of claim 1, wherein the plurality of ramp signals comprise a first ramp signal and a second ramp signal, the starting time of the second ramp signal is determined based on a comparison result of a corresponding error signal in the plurality of error signals and the first ramp signal.

4. The power converter device of claim 1, wherein a positive slope of a first ramp signal in the plurality of ramp signals is the same as a positive slope of a second ramp signal in the plurality of ramp signals.

5. The power converter device of claim 1, wherein an end time of each of the plurality of ramp signals is different from each other.

6. The power converter device of claim 1, wherein the detector circuitry comprises:
   a first error amplifier circuit configured to generate a first error signal in the plurality of error signals according to a first output voltage in the plurality of output voltages and a first reference voltage in the plurality of reference voltages;
   a second error amplifier circuit configured to generate a second error signal in the plurality of error signals according to a second output voltage in the plurality of output voltages and a second reference voltage in the plurality of reference voltages;
   a first comparator circuit configured to compare the first error signal with a first ramp signal in the plurality of ramp signals, in order to generate a first decision signal in the plurality of decision signals; and
   a second comparator circuit configured to compare the second error signal with a second ramp signal in the plurality of ramp signals, in order to generate a second decision signal in the plurality of decision signals.

7. The power converter device of claim 1, further comprising:
   a mode switching circuit configured to output a third ramp signal to be one of a first ramp signal and a second ramp signal in the plurality of ramp signals, and output a fourth ramp signal to be another one of the first ramp signal and the second ramp signal,
   wherein the ramp generator circuit is configured to generate the third ramp signal and the fourth ramp signal according to the plurality of control signals, in order to output the third ramp signal and the fourth ramp signal to be the first ramp signal and the second ramp signal via the mode switching circuit.

8. The power converter device of claim 1, where the ramp generator circuit comprises:
   a first capacitor;
   a plurality of first switches configured to control the first capacitor according to a plurality of first signals in the plurality of control signals, in order to generate a first ramp signal in the plurality of ramp signals;
   a second capacitor; and
   a plurality of second switches configured to control the second capacitor according to a plurality of second signals in the plurality of control signals, in order to generate a second ramp signal in the plurality of ramp signals.

9. The power converter device of claim 1, wherein the ramp generator circuit is configured to generate a second ramp signal in the plurality of ramp signals when a corresponding error signal in the plurality of error signals is equal to a first ramp signal in the plurality of ramp signals.

10. A power conversion method, comprising:
    switching a plurality of charging paths and a plurality of discharging paths of an inductor according to a plurality of switching signals, in order to generate a plurality of output voltages;
    generating a plurality of error signals according to the plurality of output voltages and a plurality of reference voltages, and respectively comparing the plurality of error signals with a plurality of ramp signals, in order to generate a plurality of decision signals;
    generating the plurality of switching signals and a plurality of control signals according to the plurality of decision signals;
    generating the plurality of ramp signals according to the plurality of control signals, wherein a starting time of each of the plurality of ramp signals is different from each other; and
    when a corresponding ramp signal in the plurality of ramp signals is equal to a corresponding error signal in the plurality of error signals, lowering levels of the plurality of ramp signals.

11. The power conversion method of claim 10, wherein respectively comparing the plurality of error signals with the plurality of ramp signals, in order to generate the plurality of decision signals comprises:
    generating the plurality of decision signals without summing up the plurality of error signals.

12. The power conversion method of claim 10, wherein the plurality of ramp signals comprise a first ramp signal and a second ramp signal, the starting time of the second ramp signal is determined based on a comparison result of a corresponding error signal in the plurality of error signals and the first ramp signal.

13. The power conversion method of claim 10, wherein respectively comparing the plurality of error signals with the plurality of ramp signals, in order to generate the plurality of decision signals comprises:
   when a corresponding error signal in the plurality of error signals is equal to a corresponding ramp signal in the plurality of ramp signals, generating a second ramp signal in the plurality of ramp signals.

14. The power conversion method of claim 10, wherein a positive slope of a first ramp signal in the plurality of ramp signals is the same as a positive slope of a second ramp signal in the plurality of ramp signals.

15. The power conversion method of claim 10, wherein respectively comparing the plurality of error signals with the plurality of ramp signals, in order to generate the plurality of decision signals comprises:
   when a corresponding ramp signal in the plurality of ramp signals is equal to a corresponding error signal in the plurality of error signals, lowering levels of the plurality of ramp signals.

16. The power conversion method of claim 10, wherein an end time of each of the plurality of ramp signals is different from each other.

* * * * *